United States Patent
Kakimoto et al.

(10) Patent No.: US 11,834,115 B2
(45) Date of Patent: Dec. 5, 2023

(54) STEERING SYSTEM

(71) Applicants: JTEKT CORPORATION, Osaka (JP); TOYOTA JIDOSHA KABUSHIKI KAISHA, Toyota (JP)

(72) Inventors: Yusuke Kakimoto, Okazaki (JP); Yoshiyuki Uchino, Okazaki (JP); Kenji Shibata, Nagoya (JP); Takafumi Sato, Kariya (JP)

(73) Assignees: JTEKT CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 17/347,142

(22) Filed: Jun. 14, 2021

(65) Prior Publication Data

US 2021/0394826 A1   Dec. 23, 2021

(30) Foreign Application Priority Data

Jun. 18, 2020  (JP) .................................. 2020-105197

(51) Int. Cl.
*B62D 5/04* (2006.01)
*B62D 7/22* (2006.01)
(Continued)

(52) U.S. Cl.
CPC .............. *B62D 6/008* (2013.01); *B62D 5/006* (2013.01); *B62D 5/0481* (2013.01)

(58) Field of Classification Search
None
See application file for complete search history.

(56) References Cited

U.S. PATENT DOCUMENTS

| 2004/0138796 A1* | 7/2004 | Yao ........................ B62D 5/006 180/443 |
| 2004/0236487 A1 | 11/2004 | Yao et al. |

(Continued)

FOREIGN PATENT DOCUMENTS

| EP | 1308367 A2 * | 5/2003 | ............. B60R 25/02 |
| EP | 1308367 A2 | 5/2003 | |

(Continued)

OTHER PUBLICATIONS

Nov. 16, 2021 Extended European Search Report issued in European Patent Application No. 21179421.9.
(Continued)

*Primary Examiner* — Adam D Tissot
*Assistant Examiner* — Laura E Linhardt
(74) *Attorney, Agent, or Firm* — Oliff PLC (57) ABSTRACT

A steering system includes a steering shaft; a reaction motor; and a control unit configured to control the reaction motor. The control unit has a function of performing a correction process of rotating the steering wheel using the reaction motor such that a displacement in a rotational position of the steering wheel with respect to a correct rotational position corresponding to a turning position of the turning wheels decreases when a power supply of the vehicle is turned on and the rotational position of the steering wheel is different from the correct rotational position. The control unit is configured to perform the correction process when the displacement is equal to or greater than a predetermined permissible value and not to perform the correction process when the displacement is less than the permissible value.

13 Claims, 3 Drawing Sheets

(51) Int. Cl.
　　　*B62D 15/02*　　　(2006.01)
　　　*B62D 6/00*　　　(2006.01)
　　　*B62D 5/00*　　　(2006.01)

(56)　　　　　　　References Cited

U.S. PATENT DOCUMENTS

2006/0129294 A1　　6/2006　Moser et al.
2015/0353079 A1　12/2015　Suzuki
2018/0141584 A1*　5/2018　El Aile .............. B62D 15/0245

FOREIGN PATENT DOCUMENTS

| JP | H10-329742 | A | 12/1998 |
| JP | 2004-231085 | A | 8/2004 |
| JP | 2006-321434 | A | 11/2006 |
| WO | 2014/108968 | A1 | 7/2014 |

OTHER PUBLICATIONS

Aug. 8, 2023 Office Action issued in Japanese Patent Application No. 2020-105197.

\* cited by examiner

STEERING SYSTEM

CROSS-REFERENCE TO RELATED APPLICATION

This application claims priority to Japanese Patent Application No. 2020-105197 filed on Jun. 18, 2020, incorporated herein by reference in its entirety.

BACKGROUND

1. Technical Field

The disclosure relates to a steering system of a vehicle.

2. Description of Related Art

There has been a so-called steer-by-wire steering system in which transmission of power between a steering wheel and turning wheels is cut off. Such a steering system includes a reaction mechanism including a reaction motor that is a source of a steering reaction force applied to a steering shaft and a turning mechanism including a turning motor that is a source of a turning force for turning the turning wheels. When a vehicle is traveling, a control device for the steering system generates a steering reaction force through power supply control for the reaction motor and turns the turning wheels through power supply control for the turning motor.

In such a steer-by-wire steering system, the steering wheel is not restricted by the turning mechanism. Accordingly, when a certain external force is applied to the steering wheel in a state in which the power supply of the vehicle is turned off, there is a likelihood that the steering wheel may rotate. At this time, since the turning wheels do not operate, a positional relationship between the steering wheel and the turning wheels may be different from an original positional relationship corresponding to a predetermined steering angle ratio. Here, the steering angle ratio means a ratio between a turning angle of the turning wheels and a steering angle of the steering wheel.

Therefore, for example, in a steering system disclosed in Japanese Unexamined Patent Application Publication No. 2006-321434 (JP 2006-321434 A), a process of correcting a rotational position of a steering wheel is performed when a power supply of a vehicle is turned on. A control device for the steering system stores the rotational position of the steering wheel at a time when the power supply of the vehicle has been turned off. The control device calculates a displacement in rotational position of the steering wheel by comparing the rotational position of the steering wheel when the power supply of the vehicle is turned off and the rotational position of the steering wheel when the power supply of the vehicle is turned on, and drives a reaction motor such that the displacement becomes 0 (zero).

SUMMARY

With the steering system disclosed in JP 2006-321434 A, a displacement in the positional relationship between the steering wheel and the turning wheels is reliably improved. However, in the steering system disclosed in JP 2006-321434 A, there is the following concern. Here, the steering wheel rotates automatically at a time at which the power supply of the vehicle is turned on in order to correct the positional relationship between the steering wheel and the turning wheels. A driver may feel discomforted due to the automatic rotation of the steering wheel. In a period until the process of correcting the rotational position of the steering wheel is completed after the power supply of the vehicle has been turned on, the driver cannot start the vehicle. Accordingly, the driver may become stressed.

The disclosure provides a steering system that can decrease discomfort or stress of a driver due to a process of correcting a positional relationship between a steering wheel and turning wheels.

According to an aspect of the disclosure, there is provided a steering system including a steering shaft that rotates in accordance with an operation of a steering wheel, transmission of power between the steering shaft and turning wheels of a vehicle being cut off; a reaction motor configured to generate a steering reaction force that is a torque applied to the steering shaft in a direction opposite to a steering direction; and a control unit configured to control the reaction motor. The control unit has a function of performing a correction process of rotating the steering wheel using the reaction motor such that a displacement in a rotational position of the steering wheel with respect to a correct rotational position corresponding to a turning position of the turning wheels decreases when a power supply of the vehicle is turned on and the rotational position of the steering wheel is different from the correct rotational position. The control unit is configured to perform the correction process when the displacement is equal to or greater than a predetermined permissible value and not to perform the correction process when the displacement is less than the permissible value.

With this configuration, when the power supply of the vehicle is turned on and the displacement of the rotational position of the steering wheel with respect to the turning position of the turning wheels is equal to or greater than the predetermined permissible value, the process of correcting the rotational position of the steering wheel is performed. On the other hand, when the power supply of the vehicle is turned on and the displacement in the rotational position of the steering wheel with respect to the turning position of the turning wheels is less than the predetermined permissible value, the process of correcting the rotational position of the steering wheel is not performed. This decreases the possibility of automatically rotating the steering wheel when the power supply of the vehicle is turned on. Thus, it is possible to decrease a driver's feeling of discomfort. Since the possibility that the driver waits for completion of the process of correcting the rotational position of the steering wheel decreases, it is possible to decrease a driver's feeling of stress.

In the steering system according to the aspect, the correction process may include a first correction process of rotating the steering wheel such that the displacement becomes zero and a second correction process of rotating the steering wheel such that the displacement becomes the permissible value. In this case, the control unit may be configured to perform the first correction process when the displacement is greater than a predetermined limit value and to perform the second correction process when the displacement is equal to or greater than the permissible value and equal to or less than the limit value.

With this configuration, when the power supply of the vehicle is turned on and the displacement of the rotational position of the steering wheel with respect to the turning position of the turning wheels is greater than the predetermined limit value, the first correction process is performed. By performing the first correction process, the rotational position of the steering wheel is synchronized with (i.e., matched with) the position corresponding to the turning position of the turning wheels. Accordingly, it is possible to cause the vehicle to smoothly start moving without causing a driver to have a feeling of discomfort.

When the power supply of the vehicle is turned on and the displacement of the rotational position of the steering wheel with respect to the turning position of the turning wheels is equal to or greater than the permissible value and equal to or less than the limit value, the second correction process is performed. By performing the second correction process, the rotational position of the steering wheel is corrected such that the displacement of the rotational position of the steering wheel with respect to the turning position of the turning wheels reaches the permissible value. Since the rotational position of the steering wheel is not completely synchronized with (i.e., not completely matched with) the position corresponding to the turning position of the turning wheels, it is possible to shorten a period from start to stop of automatic rotation of the steering wheel. Since the time in which stop of rotation of the steering wheel is waited for is shortened, it is possible to decrease a driver's feeling of stress.

In the steering system according to the aspect, the correction process may be a process of rotating the steering wheel such that the displacement becomes zero. With this configuration, when the power supply of the vehicle is turned on and the displacement of the rotational position of the steering wheel with respect to the turning position of the turning wheels is equal to or greater than the predetermined permissible value, the rotational position of the steering wheel is synchronized with (i.e., matched with) the position corresponding to the turning position of the turning wheels by performing the correction process. Accordingly, it is possible to cause the vehicle to smoothly start moving without causing a driver to have a feeling of discomfort.

In the steering system according to the aspect, the correction process may be a process of rotating the steering wheel such that the displacement becomes the permissible value. With this configuration, when the power supply of the vehicle is turned on and the displacement of the rotational position of the steering wheel with respect to the turning position of the turning wheels is equal to or greater than the predetermined permissible value, the displacement of the rotational position of the steering wheel is decreased to the permissible value by performing the correction process. Accordingly, it is possible to cause the vehicle to smoothly start moving without causing a driver to have a feeling of discomfort.

The steering system according to the aspect may further include a turning shaft that turns the turning wheels, transmission of the power between the steering wheel and the turning shaft being cut off; and a turning motor configured to generate a turning force that is a torque applied to the turning shaft to turn the turning wheels. In this case, the control unit may be configured to control the turning motor such that the turning position of the turning wheels becomes a position corresponding to the rotational position of the steering wheel, when the rotational position of the steering wheel is different from the rotational position corresponding to the turning position of the turning wheels at a time at which the vehicle starts moving.

With this configuration, when the rotational position of the steering wheel has not been synchronized with (i.e., has not been matched with) the turning position of the turning wheels at the time at which the vehicle starts moving, the turning position of the turning wheels is corrected to a position corresponding to the rotational position of the steering wheel. Accordingly, it is possible to cause the vehicle to start moving while curbing a driver's feeling of discomfort.

With the steering system according to the aspect of the disclosure, it is possible to decrease discomfort or stress of a driver due to the process of correcting the positional relationship between the steering wheel and the turning wheels.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

Each of portions (a) and (b) in FIG. 3 are front views illustrating a first example of change in a rotational position of a steering wheel after a power supply of a vehicle has been turned on according to the embodiment.

Each of portions (a) and (b) in FIG. 4 are front views illustrating a second example of change in the rotational position of the steering wheel after the power supply of the vehicle has been turned on according to the embodiment; and Each of portions (a), (b), and (c) in FIG. 5 are front views illustrating a third example of change in the rotational position of the steering wheel after the power supply of the vehicle has been turned on according to the embodiment.

DETAILED DESCRIPTION OF EMBODIMENTS

Figure 1:
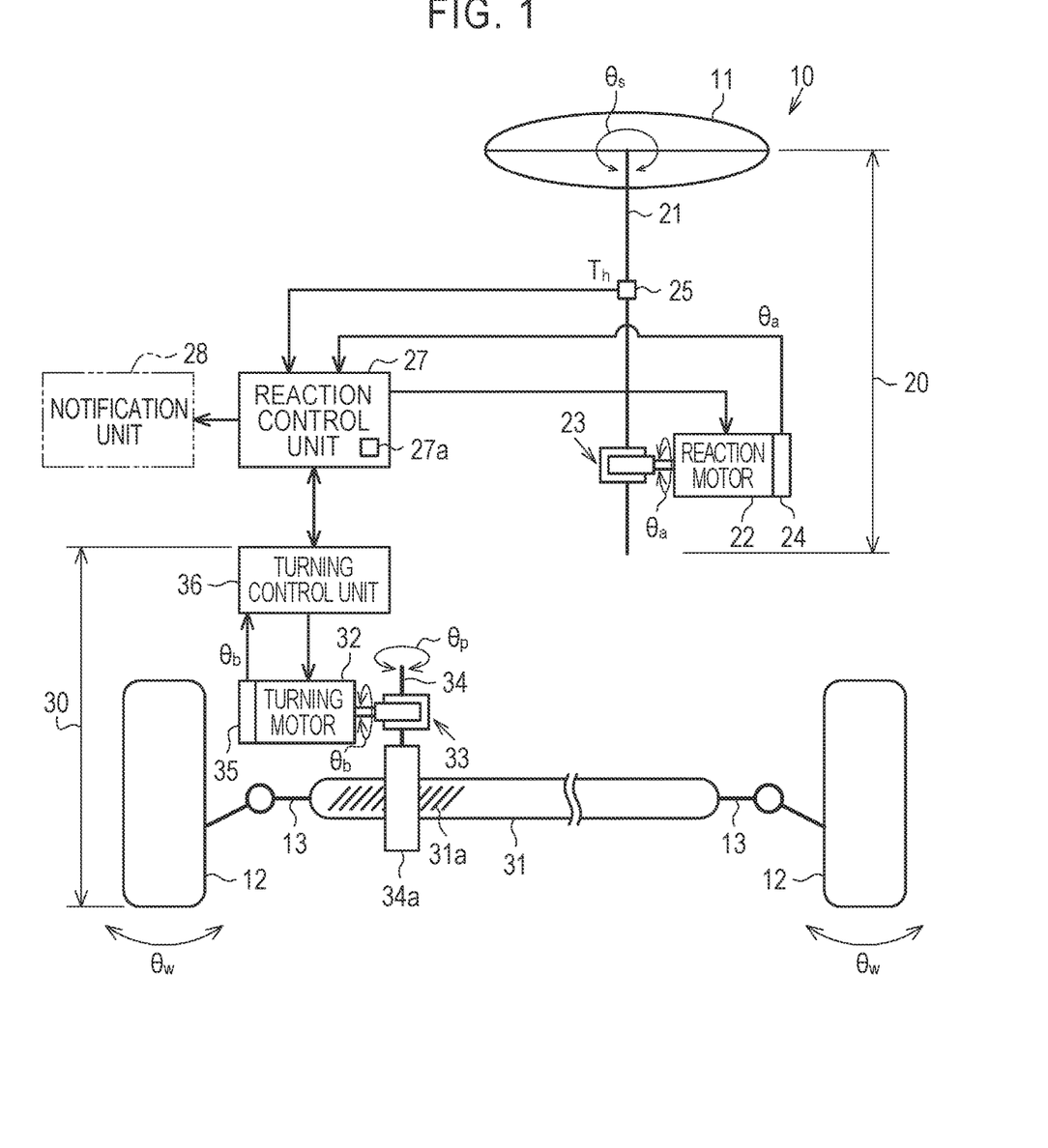
FIG. 1 is a diagram illustrating a configuration of a steering system according to an embodiment.

Hereinafter, a steering system according to an embodiment of the disclosure will be described. As illustrated in FIG. 1, a steering system 10 of a vehicle includes a reaction unit 20 that applies a steering reaction force to a steering wheel 11 of the vehicle and a turning unit 30 that turns turning wheels 12 of the vehicle. The steering reaction force is a torque that is applied in a direction opposite to an operating direction of the steering wheel 11 which is operated by a driver. By applying the steering reaction force to the steering wheel 11, an appropriate feeling of response can be given to the driver.

The reaction unit 20 includes a steering shaft 21 to which the steering wheel 11 is connected, a reaction motor 22, a speed reduction mechanism 23, a rotation angle sensor 24, a torque sensor 25, and a reaction control unit 27.

The reaction motor 22 is a source that generates a steering reaction force. For example, a three-phase brushless motor is employed as the reaction motor 22. The reaction motor 22 is connected to the steering shaft 21 via the speed reduction mechanism 23. A torque which is generated by the reaction motor 22 is applied as a steering reaction force to the steering shaft 21.

The rotation angle sensor 24 is provided in the reaction motor 22. The rotation angle sensor 24 detects a rotation angle $\theta_a$ of the reaction motor 22. The torque sensor 25 is provided in a part between the speed reduction mechanism 23 and the steering wheel 11 in the steering shaft 21. The torque sensor 25 detects a steering torque $T_h$ which is applied to the steering shaft 21 through an operation of rotating the steering wheel 11.

The reaction control unit 27 calculates a steering angle $\theta_s$ which is a rotation angle of the steering shaft 21 based on the rotation angle $\theta_a$ of the reaction motor 22 detected by the rotation angle sensor 24. The reaction control unit 27 counts the number of rotations of the reaction motor 22 with respect to the rotation angle $\theta_a$ of the reaction motor 22 corresponding to a neutral steering position of the steering wheel 11 (hereinafter the rotation angle $\downarrow_a$ corresponding to the neutral steering position will be referred to as a "motor midpoint"). The reaction control unit 27 calculates a total angle which is an angle obtained by totaling the rotation angle $\theta_a$ using the motor midpoint as an origin, and calculates the steering angle $\theta_s$ of the steering wheel 11 by multiplying the calculated total angle by a conversion factor based on a speed reduction ratio of the speed reduction mechanism 23. The motor midpoint is stored as steering angle midpoint information in the reaction control unit 27.

The reaction control unit 27 performs reaction control for generating a steering reaction force corresponding to the steering torque $T_h$ through drive control for the reaction motor 22. The reaction control unit 27 calculates a target steering reaction force based on the steering torque $T_h$ detected by the torque sensor 25 and calculates a target steering angle of the steering wheel 11 based on the calculated target steering reaction force and the steering torque $T_h$. The reaction control unit 27 calculates a difference between the steering angle $\theta_s$ which is calculated based on the rotation angle $\theta_a$ of the reaction motor 22 and the target steering angle, and controls supply of electric power to the reaction motor 22 such that the difference is cancelled out. The reaction control unit 27 performs vector control for the reaction motor 22 using the rotation angle $\theta_a$ of the reaction motor 22 detected by the rotation angle sensor 24.

The turning unit 30 includes a turning shaft 31, a turning motor 32, a speed reduction mechanism 33, a pinion shaft 34, a rotation angle sensor 35, and a turning control unit 36. The turning shaft 31 extends in a vehicle width direction (the right-left direction in FIG. 1). Right and left turning wheels 12 are respectively connected to both ends of the turning shaft 31 via tie rods 13.

The turning motor 32 is a source from which a turning force is generated. For example, a three-phase brushless motor is employed as the turning motor 32. The turning motor 32 is connected to the pinion shaft 34 via the speed reduction mechanism 33. Pinion teeth 34a of the pinion shaft 34 engage with rack teeth 31a of the turning shaft 31. A torque which is generated by the turning motor 32 is applied as a turning force to the turning shaft 31 via the pinion shaft 34. The turning shaft 31 moves in the vehicle width direction (the right-left direction in FIG. 1) with rotation of the turning motor 32. A turning angle $\theta_w$ of the turning wheels 12 changes with the movement of the turning shaft 31.

The rotation angle sensor 35 is provided in the turning motor 32. The rotation angle sensor 35 detects a rotation angle $\theta_b$ of the turning motor 32. The turning control unit 36 performs turning control for turning the turning wheels 12 based on a steering state through drive control for the turning motor 32. The turning control unit 36 calculates a rotation angle $\theta_p$ of the pinion shaft 34 based on the rotation angle $\theta_b$ of the turning motor 32 detected by the rotation angle sensor 35. The turning control unit 36 calculates a target rotation angle of the pinion shaft 34 based on the target steering angle calculated by the reaction control unit 27 or the steering angle $\theta_s$. Here, the target rotation angle of the pinion shaft 34 is calculated based on the viewpoint of realizing a predetermined steering angle ratio. The turning control unit 36 calculates a difference between the target rotation angle of the pinion shaft 34 and an actual rotation angle $\theta_p$ and controls supply of electric power to the turning motor 32 such that the difference is cancelled out. The turning control unit 36 performs vector control for the turning motor 32 using the rotation angle $\theta_b$ of the turning motor 32 detected by the rotation angle sensor 35.

In the steer-by-wire steering system 10, since the steering wheel 11 is not restricted by the turning unit 30, there is a likelihood that the following events may occur.

That is, when a power supply of the vehicle is in an on state, the steering wheel 11 and the turning wheels 12 are synchronized with each other. Accordingly, a positional relationship between the steering wheel 11 and the turning wheels 12 is maintained at a positional relationship corresponding to a predetermined steering angle ratio. When a certain external force is applied to the steering wheel 11 in a state in which the power supply of the vehicle is in an off state, there is a likelihood that the steering wheel 11 may rotate. At this time, since the turning shaft 31 does not operate, the positional relationship between the steering wheel 11 and the turning wheels 12 may become different from an original positional relationship corresponding to the predetermined steering angle ratio.

Accordingly, the steering system 10 performs synchronization control for synchronizing the rotational position of the steering wheel 11 with the turning position of the turning wheels 12 as an initial operation when the power supply of the vehicle is turned on again. It is considered that the steering system 10 performs the following process as an example of the synchronization control.

For example, in the case where the steering wheel 11 rotates by a predetermined angle in the counterclockwise direction (a positive direction) in a period in which the power supply of the vehicle is in the off state, the steering wheel 11 is rotated by the predetermined angle in the clockwise direction (a negative direction) through drive control for the reaction motor 22 when the power supply of the vehicle is turned on again. Accordingly, the positional relationship between the steering wheel 11 and the turning wheels 12 returns to the original positional relationship corresponding to the predetermined steering angle ratio.

As illustrated in FIG. 1, the reaction control unit 27 includes a storage unit 27a. When the power supply of the vehicle is switched from ON to OFF (i.e., from the on state to the off state), the reaction control unit 27 stores, in the storage unit 27a, the steering angle $\theta_s$ calculated immediately before the power supply of the vehicle is switched from ON to OFF, as a reference steering angle. The reference steering angle serves as a reference for determining whether the steering wheel 11 has rotated in a period in which the power supply of the vehicle has been in the off state.

When the power supply of the vehicle is switched from OFF to ON (i.e., from the off state to the on state), the reaction control unit 27 determines whether position adjustment of the steering wheel 11 is necessary by comparing the reference steering angle stored in the storage unit 27a with the steering angle $\theta_s$ calculated immediately after the power supply of the vehicle has been turned on.

When the reference steering angle which is the steering angle $\theta_s$ immediately before the power supply of the vehicle is turned off and the steering angle $\theta_s$ immediately after the power supply of the vehicle is turned on again match each other, the reaction control unit 27 determines that the position adjustment of the steering wheel 11 is not necessary. Since the steering angle $\theta_s$ does not change in a period until the power supply of the vehicle has been turned on again after the supply of the vehicle was turned off, it is apparent that the steering wheel 11 has not rotated. The reaction control unit 27 starts normal reaction control for generating a steering reaction force based on the steering torque $T_h$.

When the reference steering angle which is the steering angle $\theta_s$ immediately before the power supply of the vehicle is turned off and the steering angle $\theta_s$ immediately after the power supply of the vehicle is turned on again do not match each other, the reaction control unit 27 determines that the position adjustment of the steering wheel 11 is necessary, and performs the position adjustment for the steering wheel 11. For example, the reaction control unit 27 calculates a difference between the reference steering angle and the steering angle $\theta_s$ immediately after the power supply of the vehicle has been turned on and controls supply of electric power to the reaction motor 22 such that the difference is cancelled out. Specifically, the reaction control unit 27 sets the reference steering angle as a target steering angle which is a target value of the steering angle $\theta_s$, and performs feedback control for the steering angle $\theta_s$ such that the steering angle $\theta_s$ reaches the set target steering angle. When the target steering angle and the current steering angle $\theta_s$ match each other, the position adjustment of the steering wheel 11 is completed.

In addition, the reaction control unit 27 may use the following value as the reference steering angle. That is, the reaction control unit 27 acquires, from the turning control unit 36, the rotation angle $\theta_p$ of the pinion shaft 34 immediately after the power supply of the vehicle is switched from OFF to ON, and calculates the steering angle $\theta_s$ corresponding to the acquired rotation angle $\theta_p$ of the pinion shaft 34 based on a steering angle ratio. The reaction control unit 27 uses the steering angle $\theta_s$ corresponding to the calculated rotation angle $\theta_p$ of the pinion shaft 34 as the reference steering angle. With this configuration as well, the rotational position of the steering wheel 11 can be corrected to a position corresponding to the turning position of the turning wheels 12.

In order to correct the positional relationship between the steering wheel 11 and the turning wheels 12, the steering wheel 11 is automatically rotated at the time at which the power supply of the vehicle is turned on. A driver may have a feeling of discomfort due to this automatic rotation of the steering wheel. The driver cannot start the vehicle in a period until the process of correcting the rotational position of the steering wheel is completed after the power supply of the vehicle has been turned on. Accordingly, the driver may feel stressed.

Therefore, in this embodiment, the following process is performed as an initial operation when the power supply of the vehicle is switched from OFF to ON, based on a viewpoint of decreasing a driver's feeling of discomfort or stress due to the process of correcting the positional relationship between the steering wheel and the turning wheels.

Figure 2:
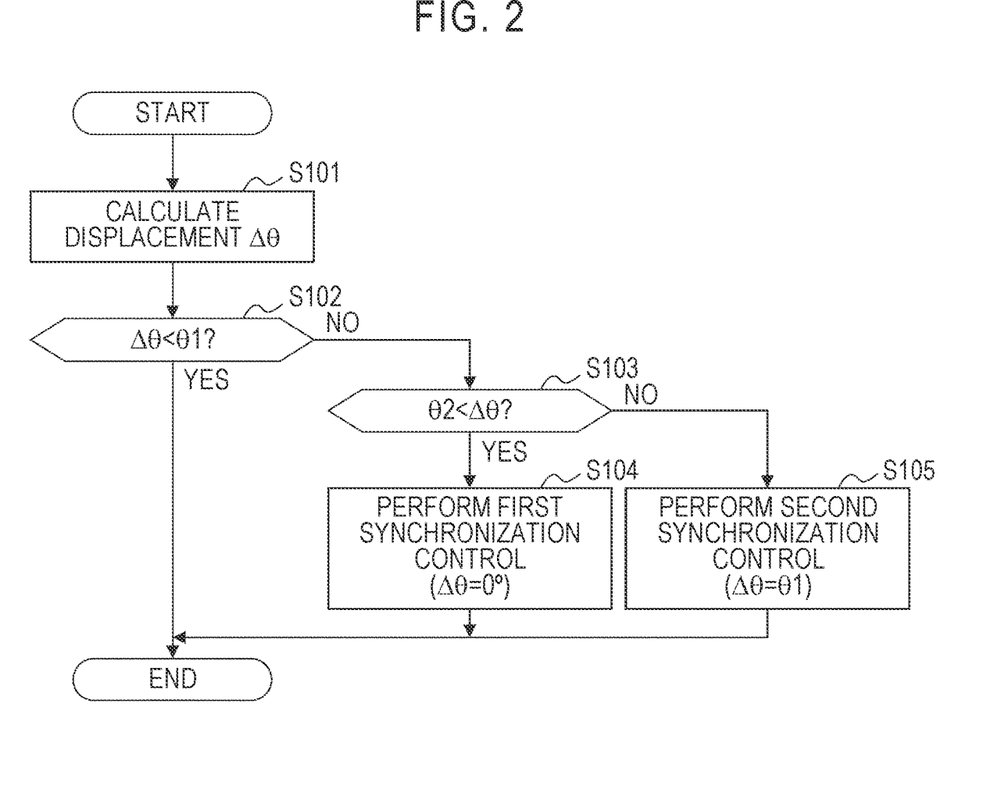
FIG. 2 is a flowchart a process routine of synchronization control which is performed by a reaction control unit according to the embodiment.

As illustrated in the flowchart of FIG. 2, the reaction control unit 27 first calculates a displacement $\Delta\theta$ of the rotational position of the steering wheel 11 with respect to the turning position of the turning wheels 12 (Step S101). The displacement $\Delta\theta$ is also an amount of rotation of the steering wheel 11 by which the steering wheel 11 is required to rotate in order to correct the rotational position of the steering wheel 11 to a rotational position corresponding to the turning position of the turning wheels 12. The reaction control unit 27 calculates the displacement $\Delta\theta$, for example, using Expression (A).

$$\Delta\theta = |\theta_{s0} - \theta_s| \quad\quad\quad (A)$$

Here, "$\theta_{s0}$" is the reference steering angle stored in the storage unit 27a immediately before the power supply of the vehicle has been turned off. "$\theta_s$" is the steering angle immediately after the power supply of the vehicle has been turned on. Regarding the sign of the steering angle $\theta_s$, for example, the rightward steering direction with respect to a neutral steering position ($\theta_s=0°$) of the steering wheel 11 is defined as being negative and the leftward steering direction is defined as being positive.

Then, the reaction control unit 27 determines whether the displacement $\Delta\theta$ is less than a first angle threshold value $\theta1$ (Step S102). The first angle threshold value $\theta1$ is set, for example, based on an angle at which a driver does not feel discomforted when the turning position of the turning wheels 12 is corrected to correspond to the rotational position of the steering wheel 11 at the time at which the vehicle starts moving.

When the displacement $\Delta\theta$ is less than the first angle threshold value $\theta1$ (YES in Step S102), the reaction control unit 27 ends this routine. In this case, the steering wheel 11 is not rotated automatically.

When the displacement $\Delta\theta$ is equal to or greater than the first angle threshold value $\theta1$ (NO in Step S102), the reaction control unit 27 determines whether the displacement $\Delta\theta$ is greater than a second angle threshold value $\theta2$ (Step S103). The second angle threshold value $\theta2$ is set, for example, based on an angle at which a driver may feel discomforted when the turning position of the turning wheels 12 is corrected to correspond to the rotational position of the steering wheel 11 at the time at which the vehicle starts moving.

When the displacement $\Delta\theta$ is greater than the second angle threshold value $\theta2$ (YES in Step S103), the reaction control unit 27 performs first synchronization control (Step S104) and ends this routine. The first synchronization control is control for correcting the rotational position of the steering wheel 11 to a position corresponding to the turning position of the turning wheels 12. The reaction control unit 27 controls supply of electric power to the reaction motor 22 such that the displacement $\Delta\theta$ calculated in Step S101 becomes "0." More specifically, the reaction control unit 27 sets the reference steering angle $\theta_{s0}$ as a target steering angle and performs feedback control for the steering angle $\theta_s$ such that the steering angle $\theta_s$ reaches the set target steering angle. When the steering angle $\theta_s$ reaches (i.e., matches) the target steering angle, the first synchronization control is completed.

When the displacement $\Delta\theta$ is not greater than the second angle threshold value $\theta2$, i.e., when the displacement $\Delta\theta$ is equal to or less than the second angle threshold value $\theta2$ (NO in Step S103), the reaction control unit 27 performs second synchronization control (Step S105) and ends this routine. The second synchronization control is control for decreasing the displacement $\Delta\theta$ to a lower value instead of decreasing the displacement $\Delta\theta$ to "0." By performing the second synchronization control, the rotational position of the steering wheel 11 is corrected to a position at which a driver does not feel discomforted even when the turning position of the turning wheels 12 is corrected to correspond to the rotational position of the steering wheel 11 at the time at which the vehicle starts moving. For example, the reaction control unit 27 may correct the rotational position of the steering wheel 11 such that the steering angle $\theta_s$ reaches the first angle threshold value $\theta1$. The reaction control unit 27 sets the first angle threshold value $\theta1$ as a target steering angle and performs feedback control for the steering angle $\theta_s$ such that the steering angle $\theta_s$ reaches the set target steering angle. When the steering angle $\theta_s$ reaches (i.e., matches) the target steering angle, the second synchronization control is completed.

When the steering angle $\theta_s$ calculated by the reaction control unit 27 does not correspond to the current rotation angle $\theta_p$ of the pinion shaft 34 immediately after the process of adjusting the rotational position of the steering wheel 11 has been completed by the reaction control unit 27, the turning control unit 36 maintains the rotation angle $\theta_p$ of the pinion shaft 34 at the current rotation angle $\theta_p$. Then, the turning control unit 36 controls supply of electric power to the turning motor 32, for example, such that the rotation angle $\theta_p$ of the pinion shaft 34 is corrected to an angle corresponding to the steering angle $\theta_s$ at the time at which the vehicle starts moving. The turning control unit 36 determines whether the vehicle has started moving based on a vehicle speed or a steering torque $T_h$.

In this embodiment, the first angle threshold value $\theta 1$ corresponds to a permissible value for the displacement $\Delta\theta$. The second angle threshold value $\theta 2$ corresponds to a limit value for the displacement $\Delta\theta$. The first synchronization control corresponds to a first correction process of rotating the steering wheel 11 such that the displacement $\Delta\theta$ becomes zero. The second synchronization control corresponds to a second correction process of rotating the steering wheel 11 such that the displacement $\Delta\theta$ becomes the first angle threshold value (the permissible value).

Behavior of the steering wheel 11 and the turning wheels 12 in the period until the rotational position of the steering wheel 11 and the turning position of the turning wheels 12 are synchronized with each other after the power supply of the vehicle has been turned on will be described below in three situations.

Here, it is assumed that the turning wheels 12 are located at a neutral turning position (turning angle $\theta_w=°$) corresponding to straight movement of the vehicle immediately after the power supply of the vehicle has been turned on. The steering wheel 11 needs to be inherently located at a neutral steering position (steering angle $\theta_s=0°$) corresponding to straight movement of the vehicle. A steering angle ratio which is a ratio between the turning angle $\theta_w$ and the steering angle $\theta_s$ is "1:1," that is, the value of the steering angle ratio is "1."

Figure 3:
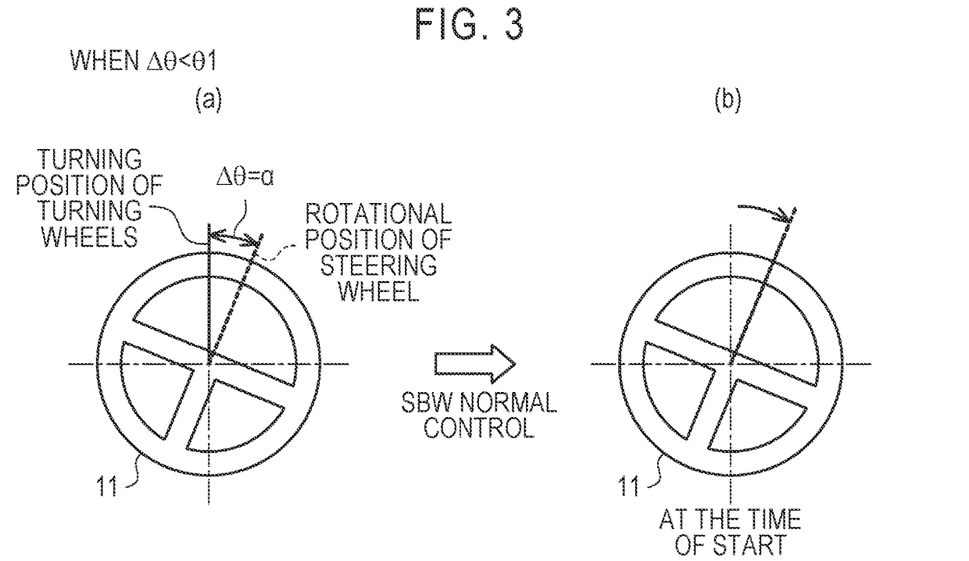

First, a first situation will be described. As illustrated in the portion (a) in FIG. 3, immediately after the power supply of the vehicle has been turned on, the steering wheel 11 is located at a rotational position displaced by an angle $\alpha$ which is less than the first angle threshold value $\theta 1$ in the clockwise direction (the negative direction) with respect to the turning position of the turning wheels 12. That is, the displacement $\Delta\theta$ of the rotational position of the steering wheel 11 with respect to the turning position of the turning wheels 12 is the angle $\alpha$. In this case, none of the first synchronization control and the second synchronization control for the steering wheel 11 is performed and the state of the steering system 10 transitions to a state in which normal reaction control and turning control (i.e., SBW normal control) can be performed. As illustrated in the portion (b) in FIG. 3, the turning position of the turning wheels 12 is synchronized with the rotational position of the steering wheel 11, for example, at the time at which the vehicle starts moving (i.e., at the time of start). Here, since the value of the steering angle ratio is "1," the turning wheels 12 are turned by the angle $\alpha$ in the clockwise direction.

Figure 4:
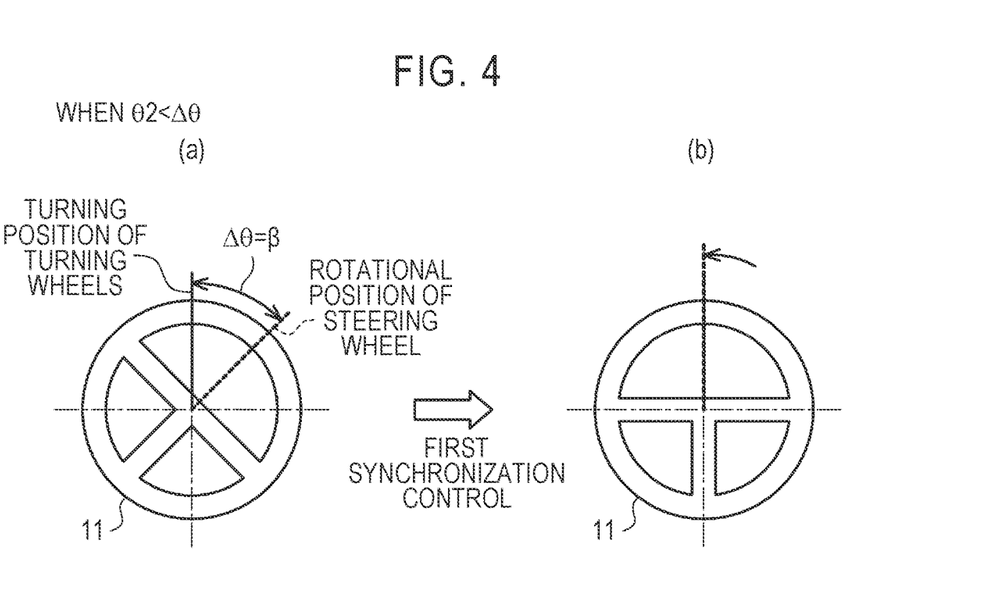

A second situation will next be described. As illustrated in the portion (a) in FIG. 4, immediately after the power supply of the vehicle has been turned on, the steering wheel 11 is located at a rotational position displaced by an angle $\beta$ which is greater than the second angle threshold value $\theta 2$ in the clockwise direction (the negative direction) with respect to the turning position of the turning wheels 12. That is, the displacement $\Delta\theta$ of the rotational position of the steering wheel 11 with respect to the turning position of the turning wheels 12 is the angle $\beta$. In this case, the first synchronization control for the steering wheel 11 is performed. As illustrated in the portion (b) in FIG. 4, the rotational position of the steering wheel 11 is synchronized with the turning position of the turning wheels 12 by performing the first synchronization control. Here, since the value of the steering angle ratio is "1," the steering wheel 11 is rotated by the angle $\theta$ which is the displacement $\Delta\theta$ in the counterclockwise direction. After the first synchronization control has been completed, the state of the steering system 10 transitions to a state in which normal reaction control and turning control can be performed.

Figure 5:
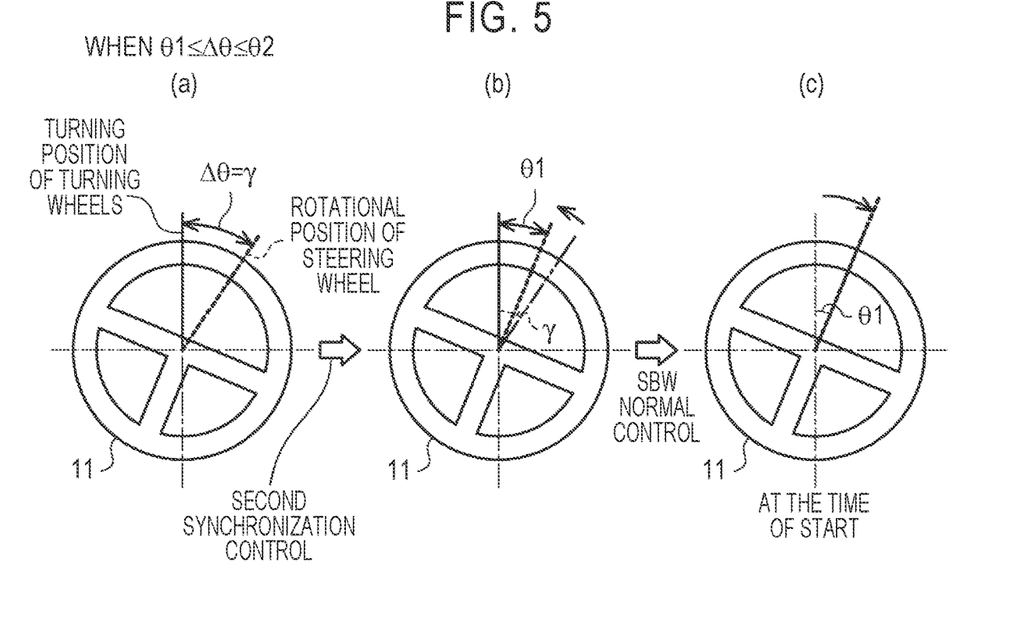

A third situation will be finally described below. As illustrated in the portion (a) in FIG. 5, immediately after the power supply of the vehicle has been turned on, the steering wheel 11 is located at a rotational position displaced by an angle $\gamma$ which is equal to or greater than the first angle threshold value $\theta 1$ and equal to or less than the second angle threshold value $\theta 2$ in the clockwise direction (the negative direction) with respect to the turning position of the turning wheels 12. That is, the displacement $\Delta\theta$ of the rotational position of the steering wheel 11 with respect to the turning position of the turning wheels 12 is the angle $\gamma$. In this case, the second synchronization control for the steering wheel 11 is performed. As illustrated in the portion (b) in FIG. 5, the steering wheel 11 is rotated by an absolute value of a difference between the first angle threshold value $\theta 1$ and the angle $\gamma$ in the counterclockwise direction (the positive direction). Thereafter, the state of the steering system 10 transitions to a state in which normal reaction control and turning control (i.e., the SBW normal control) can be performed. As illustrated in the portion (c) in FIG. 5, the turning position of the turning wheels 12 is synchronized with the rotational position of the steering wheel 11, for example, at the time at which the vehicle starts moving (i.e., at the time of start). Here, since the value of the steering angle ratio is "1," the turning wheels 12 are turned by the same angle as the first angle threshold value $\theta 1$ which is the displacement $\Delta\theta$ in the clockwise direction.

Therefore, according to this embodiment, the following advantages can be achieved. (1) When the power supply of the vehicle is turned on and the displacement $\Delta\theta$ of the rotational position of the steering wheel 11 with respect to the turning position of the turning wheels 12 is less than the first angle threshold value $\theta 1$, no synchronization control is performed. This decreases the possibility of automatically rotating the steering wheel 11 when the power supply of the vehicle is turned on, as a whole, because no synchronization control is performed when the displacement $\Delta\theta$ is less than the first angle threshold value $\theta 1$. Accordingly, it is possible to decrease a driver's feeling of discomfort. Since the possibility that a driver waits for completion of position adjustment of the steering wheel 11 decreases, it is possible to decrease a driver's feeling of stress.

(2) When the power supply of the vehicle is turned on and the displacement $\Delta\theta$ is greater than the second angle threshold value $\theta 2$, the first synchronization control is performed. By performing the first synchronization control, the rotational position of the steering wheel 11 is completely synchronized with (i.e., completely matched with) a position corresponding to the turning position of the turning wheels 12. This prevent the situation in which, for example, the turning position of the turning wheels 12 is suddenly changed to the position corresponding to the rotational position of the steering wheel 11 at the time at which the vehicle starts moving. Accordingly, a driver can smoothly start the vehicle without feeling discomforted.

(3) When the power supply of the vehicle is turned on and the displacement $\Delta\theta$ is equal to or greater than the first angle threshold value $\theta 1$ and equal to or less than the second angle threshold value $\theta 2$, the second synchronization control is performed. By performing the second synchronization control, the rotational position of the steering wheel 11 is adjusted such that the steering angle $\theta_s$ reaches the first angle threshold value $\theta 1$. The period from start to stop of automatic rotation of the steering wheel 11 is shortened, because the rotational position of the steering wheel 11 is not completely synchronized with (i.e., not completely matched with) the position corresponding to the turning position of the turning wheels 12. Since the time in which stop of rotation of the steering wheel 11 is waited for is shortened, it is possible to decrease a driver's feeling of stress.

(4) As described in (1) and (3), when the power supply of the vehicle is turned on and the rotational position of the steering wheel 11 is not completely synchronized with the turning position of the turning wheels 12, for example, when the displacement $\Delta\theta$ is less than the first angle threshold value $\theta 1$, the turning position of the turning wheels 12 is changed to the position corresponding to the rotational position of the steering wheel 11 at the time at which the vehicle starts moving. Here, the first angle threshold value $\theta 1$ is set based on an angle at which a driver does not feel discomforted when the turning position of the turning wheels 12 is corrected to correspond to the rotational position of the steering wheel 11 at the time at which the vehicle starts moving. Accordingly, at the time at which the vehicle starts moving, it is possible to change the turning position of the turning wheels 12 to the position corresponding to the rotational position of the steering wheel 11 while restraining a driver from feeling discomforted.

The aforementioned embodiment may be modified as follows. As indicated by a line in FIG. 1, in the aforementioned embodiment, for example, when a notification unit 28 is provided in a cabin of the vehicle, the reaction control unit 27 may notify a driver of start and end of the position adjustment of the steering wheel 11 using the notification unit 28. Examples of the notification operation using the notification unit 28 include display of a text message and issuing of a voice message. With this configuration, since a driver can recognize that the steering wheel 11 is automatically rotating and the steering wheel 11 which has been automatically rotating stops automatically, it is possible to decrease the driver's feeling of discomfort.

In the aforementioned embodiment, the steering angle $\theta_s$ which is calculated based on the rotation angle $\theta_a$ of the reaction motor 22 is used, but a steering angle $\theta_s$ which is detected by a steering angle sensor may be used when a configuration including the steering angle sensor is employed in the steering system 10.

In the aforementioned embodiment, the steering angle ratio is set to an appropriate value depending on product specifications or the like. The steering angle ratio may be, for example, "$\theta_s:\theta_w=1:1$" or "$\theta_s:\theta_w=1:3$." For example, when the steering angle ratio is "$\theta_s:\theta_w=1:3$" and the steering angle $\theta_s$ is displaced by 10°, the turning angle $\theta_w$ is displaced by 30°. Accordingly, it is more preferable to accurately synchronize the steering angle $\theta_s$ and the turning angle $\theta_w$ with each other.

In the aforementioned embodiment, when the power supply of the vehicle is turned on and the displacement $\Delta\theta$ is equal to or greater than the first angle threshold value $\theta 1$ and equal to or less than the second angle threshold value $\theta 2$, the second synchronization control is performed, but the first synchronization control may be performed. In this case, at least the same advantages as described above in (2) can be achieved.

In the aforementioned embodiment, when the power supply of the vehicle is turned on and the displacement $\Delta\theta$ is greater than the second angle threshold value $\theta 2$, the first synchronization control is performed, but the second synchronization control may be performed. In this case, at least the same advantages as described above in (3) and (4) can be achieved.

In the aforementioned embodiment, when the power supply of the vehicle is turned on and the rotational position of the steering wheel 11 is not completely synchronized with the turning position of the turning wheels 12, for example, when the displacement $\Delta\theta$ is less than the first angle threshold value $\theta 1$, the turning position of the turning wheels 12 is synchronized with the rotational position of the steering wheel 11 at the time at which the vehicle starts moving, but the following process may be performed. That is, when the first angle threshold value $\theta 1$ is set to a smaller value at which a driver does not feel discomforted when the vehicle starts traveling, the turning control unit 36 may not perform the process of synchronizing the turning position of the turning wheels 12 with the rotational position of the steering wheel 11 at the time at which the vehicle starts moving.

In the aforementioned embodiment, a power supply of a vehicle may include, for example, an accessory power supply (an ACC power supply) or an ignition power supply (an IG power supply). The reaction control unit 27 and the turning control unit 36 may be configured as a single control unit.

In the aforementioned embodiment, the steering system 10 of a vehicle has a so-called linkless structure in which transmission of power between the steering shaft 21 and the turning wheels 12 is cut off, but may have a structure in which transmission of power between the steering shaft 21 and the turning wheels 12 can be cut off by a clutch. When the clutch is disengaged, the transmission of power between the steering wheel 11 and the turning wheels 12 is cut off. When the clutch is engaged, power is transmitted between the steering wheel 11 and the turning wheels 12.

What is claimed is:

1. A steer-by-wire steering system comprising:
    a steering shaft that rotates in accordance with an operation of a steering wheel, transmission of power between the steering shaft and turning wheels of a vehicle being cut off;
    a reaction motor configured to generate a steering reaction force that is a torque applied to the steering shaft in a direction opposite to a steering direction; and
    a control unit configured to control the reaction motor, wherein
    the control unit performs a correction process of rotating the steering wheel using the reaction motor so that a displacement in a rotational position of the steering wheel with respect to a correct rotational position corresponding to a turning position of the turning wheels is decreased when a power supply of the vehicle is turned on and the rotational position of the steering wheel is different from the correct rotational position, and the control unit is configured (i) to perform the correction process when the displacement is equal to or greater than a predetermined permissible value that is greater than zero and (ii) not to perform the correction process when the displacement is less than the predetermined permissible value so that the displacement remains at least up until a time at which the vehicle starts moving when the displacement is greater than zero and less than the predetermined permissible value.

2. The steering system according to claim 1, wherein:
the correction process includes a first correction process of rotating the steering wheel so that the displacement becomes zero and a second correction process of rotating the steering wheel so that the displacement becomes the predetermined permissible value; and
the control unit is configured (a) to perform the first correction process when the displacement is greater than a predetermined limit value that is greater than the predetermined permissible value and (b) to perform the second correction process when the displacement is greater than the predetermined permissible value and equal to or less than the predetermined limit value.

3. The steering system according to claim 1, wherein the correction process is a process of rotating the steering wheel so that the displacement becomes zero.

4. The steering system according to claim 1, wherein the correction process is a process of rotating the steering wheel so that the displacement becomes the predetermined permissible value when, at a time when the power supply of the vehicle is turned on, the displacement is greater than the predetermined permissible value.

5. The steering system according to claim 1, further comprising:
a turning shaft that turns the turning wheels, transmission of the power between the steering wheel and the turning shaft being cut off; and
a turning motor configured to generate a turning force that is a torque applied to the turning shaft to turn the turning wheels,
wherein the control unit is configured to control the turning motor so that the turning position of the turning wheels becomes a position corresponding to the rotational position of the steering wheel when the rotational position of the steering wheel is different from the rotational position corresponding to the turning position of the turning wheels at the time at which the vehicle starts moving.

6. A steer-by-wire steering system comprising:
a steering shaft that rotates in accordance with an operation of a steering wheel, transmission of power between the steering shaft and turning wheels of a vehicle being cut off;
a reaction motor configured to generate a steering reaction force that is a torque applied to the steering shaft in a direction opposite to a steering direction;
a turning shaft that turns the turning wheels, transmission of power between the steering wheel and the turning shaft of the vehicle being cut off;
a turning motor configured to generate a turning force that is applied to the turning shaft to turn the turning wheels; and
a control unit configured to control the reaction motor and the turning motor, wherein
the control unit is configured to, when the vehicle starts moving and the steering wheel is in a different rotational position from a correct rotational position corresponding to a turning position of the turning wheels, control the turning motor so that the turning wheels are in a correct position corresponding to a turning position of the steering wheel.

7. The steering system according to claim 6, wherein the control unit is configured to control the turning motor so that the turning position of the turning wheels corresponds to the rotational position of the steering wheel when an amount of deviation of the rotational position of the steering wheel from the correct rotational position is below a predetermined second angle threshold.

8. The steering system according to claim 6, wherein the control unit is configured to control the turning motor so that the turning position of the turning wheels corresponds to the rotational position of the steering wheel when an amount of deviation of the rotational position of the steering wheel from the correct rotational position is above a predetermined first angle threshold.

9. A steer-by-wire steering system comprising:
a steering shaft that rotates in accordance with an operation of a steering wheel, transmission of power between the steering shaft and turning wheels of a vehicle being cut off;
a reaction motor configured to generate a steering reaction force that is a torque applied to the steering shaft in a direction opposite to a steering direction;
a turning shaft that turns the turning wheels, transmission of power between the steering wheel and the turning shaft of the vehicle being cut off;
a turning motor configured to generate a turning force that is applied to the turning shaft to turn the turning wheels; and
a control unit configured to control the reaction motor and the turning motor, wherein
the control unit is configured to, when the steering wheel is in a different rotational position from a correct rotational position corresponding to a turning position of the turning wheels and an amount of deviation of the rotational position of the steering wheel from the correct rotational position is greater than a first non-zero angle threshold and less than a second non-zero angle threshold, perform both a reaction force control to rotate the steering wheel by the reaction motor and a steering control to move the turning shaft by the turning motor.

10. The steering system according to claim 9, wherein the steering control is performed when the vehicle starts moving.

11. The steering system according to claim 9, wherein
the control unit determines the amount of deviation of the rotational position of the steering wheel from the correct rotational position when a power supply of the vehicle is turned on, and
when the amount of deviation of the rotational position of the steering wheel from the correct rotational position is greater than the first non-zero angle threshold and less than the second non-zero angle threshold, the control unit first performs the reaction force control to rotate the steering wheel by the reaction motor so as to reduce the amount of deviation to the first non-zero angle without allowing the vehicle to start moving, and then, when the vehicle starts moving, the control unit performs the steering control to move the turning shaft by the turning motor to reduce the amount of deviation to zero.

12. The steering system according to claim 11, wherein when the amount of deviation of the rotational position of the steering wheel from the correct rotational position is equal to or less than the first non-zero angle threshold when the power supply of the vehicle is turned on, the control unit performs the steering control to move the turning shaft by the turning motor to reduce the deviation amount to zero when the vehicle starts moving.

13. The steering system according to claim 12, wherein when the amount of deviation of the rotational position of the steering wheel from the correct rotational position is equal to or greater than the second non-zero angle threshold when the power supply of the vehicle is turned on, the control unit performs the reaction force control to rotate the steering wheel by the reaction motor so as to reduce the amount of deviation to zero without allowing the vehicle to start moving.

* * * * *